United States Patent
Kim

(10) Patent No.: US 9,789,857 B2
(45) Date of Patent: Oct. 17, 2017

(54) APPARATUS AND METHOD OF CONTROLLING ELECTRONIC PARKING BRAKE

(71) Applicant: Hyundai Motor Company, Seoul (KR)

(72) Inventor: Sang Jun Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/146,935

(22) Filed: May 5, 2016

(65) Prior Publication Data

US 2017/0113667 A1    Apr. 27, 2017

(30) Foreign Application Priority Data

Oct. 22, 2015 (KR) .................. 10-2015-0147440

(51) Int. Cl.
*B60T 7/00* (2006.01)
*B60T 7/22* (2006.01)

(52) U.S. Cl.
CPC ........... *B60T 7/22* (2013.01); *B60T 2201/022* (2013.01)

(58) Field of Classification Search
CPC ....... B60T 7/22; B60T 8/321; B60T 2201/022
See application file for complete search history.

(56) References Cited

U.S. PATENT DOCUMENTS

| | | | | |
|---|---|---|---|---|
| 3,835,950 | A * | 9/1974 | Asano | B61L 3/18 180/167 |
| 3,934,125 | A * | 1/1976 | Macano | B61L 27/04 246/182 B |
| 6,084,508 | A * | 7/2000 | Mai | B60T 7/22 340/435 |
| 2004/0113489 | A1* | 6/2004 | Iwagawa | B60T 7/107 303/155 |
| 2005/0162012 | A1* | 7/2005 | Sakai | B60T 8/56 303/191 |
| 2010/0176653 | A1 | 7/2010 | Arakawa | |
| 2011/0024243 | A1* | 2/2011 | Choi | B60T 11/046 188/158 |

(Continued)

FOREIGN PATENT DOCUMENTS

| | | |
|---|---|---|
| EP | 1 437 254 A1 | 7/2004 |
| JP | 2013-071521 A | 4/2013 |

(Continued)

*Primary Examiner* — Behrang Badii
*Assistant Examiner* — Daniel L Greene
(74) *Attorney, Agent, or Firm* — Mintz Levin Cohn Ferris Glovsky and Popeo, P.C.; Peter F. Corless

(57) ABSTRACT

An apparatus and a method of controlling an electronic parking brake are provided to prevent collision with a preceding vehicle by generating additional target clamping force through interoperation with an advanced emergency brake system (AEBS) to improve performance of the AEBS. The apparatus includes an electric parking brake (EPB) that generates target clamping force and an information collector that collects a primary warning signal and a primary demanded deceleration by interoperating with an AEBS. A controller operates the EPB to perform a preparation process for braking when the primary warning signal is collected and perform braking until a primary actual deceleration corresponding to the primary demanded deceleration is measured when the primary demanded deceleration is collected.

20 Claims, 3 Drawing Sheets

(56) References Cited

U.S. PATENT DOCUMENTS

| | | | |
|---|---|---|---|
| 2011/0073423 A1* | 3/2011 | Moon | B60T 8/174 188/2 D |
| 2012/0245815 A1 | 9/2012 | Schneider et al. | |
| 2013/0144498 A1* | 6/2013 | Kim | B60T 7/22 701/70 |
| 2013/0267890 A1* | 10/2013 | Li | A61M 3/0225 604/24 |
| 2014/0015310 A1 | 1/2014 | Hanzawa et al. | |
| 2015/0166032 A1* | 6/2015 | No | B60T 13/746 188/162 |
| 2015/0187217 A1 | 7/2015 | Yao et al. | |
| 2016/0032995 A1* | 2/2016 | Nishino | F16D 55/225 188/72.3 |
| 2016/0214582 A1* | 7/2016 | Brenn | B60T 7/12 |
| 2016/0236660 A1* | 8/2016 | Jung | B60T 7/22 |
| 2016/0339888 A1* | 11/2016 | Yokoyama | B60T 7/042 |

FOREIGN PATENT DOCUMENTS

| | | |
|---|---|---|
| KR | 10-2005-0100988 | 10/2005 |
| KR | 10-2010-0047405 A | 5/2010 |
| KR | 10-2011-0138061 A | 12/2011 |
| KR | 10-2012-0037478 | 4/2012 |
| KR | 10-1298138 | 8/2013 |
| KR | 10-1415206 | 8/2014 |
| KR | 10-2015-0062426 | 6/2015 |

* cited by examiner

APPARATUS AND METHOD OF CONTROLLING ELECTRONIC PARKING BRAKE

CROSS-REFERENCE TO RELATED APPLICATION

This application is based on and claims the benefit of priority to Korean Patent Application No. 10-2015-0147440, filed on Oct. 22, 2015 in the Korean Intellectual Property Office, the disclosure of which is incorporated herein in its entirety by reference.

TECHNICAL FIELD

The present disclosure relates to an apparatus and a method of controlling an electronic parking brake, and more particularly, to a technology capable of effectively preventing collision with a preceding vehicle by generating additional target clamping force through interoperation with an advanced emergency brake system (AEBS) to improve performance of the AEBS.

BACKGROUND

Generally, an electric parking brake (EPB) is a brake that is locked during stopping of a vehicle and is automatically unlocked when starting the vehicle. In other words, the electronic parking brake is locked even though a driver does not engage a brake pedal during a period in which the vehicle is stopped and is automatically unlocked when the driver engages only the brake pedal in the state in which the brake is locked when the vehicle starts, such that the vehicle starts as it is. Therefore, the electronic parking brake improves convenience of the driver on a slope (e.g., inclined road), when traffic congestion is severe, or the like.

The electronic parking brake generates appropriate target clamping force by pulling a brake wire through a brake operating motor based on a result obtained by synthesizing state information such as a load of the vehicle, a gradient of a parking place, and the like, and a driver's intention. In other words, target clamping force of the vehicle is determined based on tension of the brake wire that operates the brake, and a tension measuring sensor that senses the tension of the brake wire is used to determine whether the brake wire is pulled by appropriate tension through the brake operating motor.

The tension measuring sensor transfers the tension of the brake wire to a controller (an EPB, an electronic control unit (ECU), or the like) to allow the tension of the brake wire to be appropriately adjusted. Meanwhile, an advanced emergency brake system (AEBS) senses a possibility of collision with a preceding vehicle to provide a primary warning to the driver, and automatically decelerates the vehicle to avoid the collision with the preceding vehicle while providing a secondary warning for informing the driver of automatic braking when a reaction of the driver is not present or the collision is determined to be inevitable. Since the AEBS according to the related art operates a main brake to brake the vehicle, when maximum target clamping force of the main brake is insufficient, particularly, for a commercial vehicle, collision with the preceding vehicle may not be prevented.

SUMMARY

Accordingly, the present disclosure provides a technology of assisting in an advanced emergency brake system (AEBS) using an electronic parking brake to solve the problem described above. In other words, an aspect of the present disclosure provides an apparatus and a method of controlling an electronic parking brake capable of effectively preventing collision with a preceding vehicle by generating additional target clamping force through interoperation with an AEBS to improve performance of the AEBS.

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, an apparatus of controlling an electronic parking brake may include: an electric parking brake (EPB) configured to generate target clamping force; an information collector configured to collect a primary warning signal and a primary demanded deceleration by interoperating with an AEBS; and a controller configured to operate the EPB to perform a preparation process for braking when the primary warning signal is collected by the information collector and perform braking until a primary actual deceleration that corresponds to the primary demanded deceleration is measured when the primary demanded deceleration is collected by the information collector.

According to another exemplary embodiment of the present disclosure, a method of controlling an electronic parking brake may include: collecting, by an information collector, a primary warning signal from an AEBS; performing, by a controller, a preparation process for braking; collecting, by the information collector, a primary demanded deceleration from the AEBS; and operating, by the controller, an EPB to perform braking until a primary actual deceleration corresponding to the primary demanded deceleration is measured.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
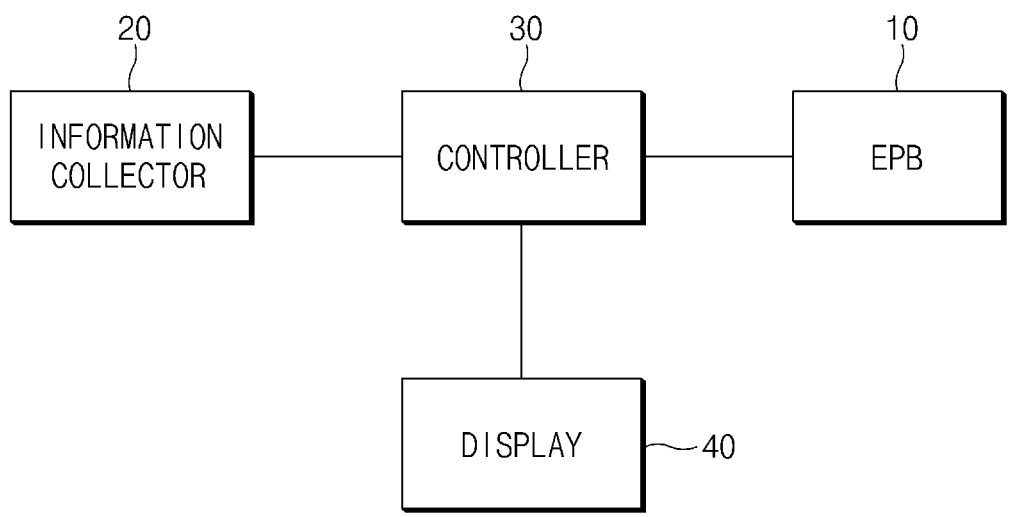
FIG. 1 is a block diagram illustrating an apparatus of controlling an electronic parking brake according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, when a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

FIG. 1 is a block diagram illustrating an apparatus of controlling an electronic parking brake according to an exemplary embodiment of the present disclosure. As illustrated in FIG. 1, the apparatus of controlling an electronic parking brake according to an exemplary embodiment of the present disclosure may include an electric parking brake (EPB) 10, an information collector 20, a controller 30, and a display 40. The controller 30 may be configured to operate the EPB 10, the information collector 20 (e.g., a sensor), and the display 40.

In particular, the EPB 10, which is an electronic parking brake, operates to prevent a driver from engaging a brake pedal (e.g., exert pressure onto the pedal) by automatically generating target clamping force when stopping a vehicle, may be configured to assist in an advanced emergency brake system (AEBS) under an operation of the controller 30 to generate additional target clamping force in the present disclosure. Although the EPB 10 has been described as an example of the means assisting in the AEBS to generate the additional target clamping force in an exemplary embodiment of the present disclosure, any device having a function that may brake or decelerate the vehicle under an operation of the controller 30 may be used.

The EPB 10 may include a brake operating motor configured to pull a brake wire to allow a brake shoe to contact a contact point of a brake drum, and a sensor configured to sense tension of the brake wire. For reference, the AEBS may be configured to sense or detect a possibility of collision with a preceding vehicle to generate a primary warning signal, and perform vehicle braking to avoid the collision with the preceding vehicle while generating a secondary warning signal that informs the driver of automatic braking when a reaction of the driver is not present (e.g., the driver does not take an action in response to the warning) or the collision is inevitable.

Figure 2:
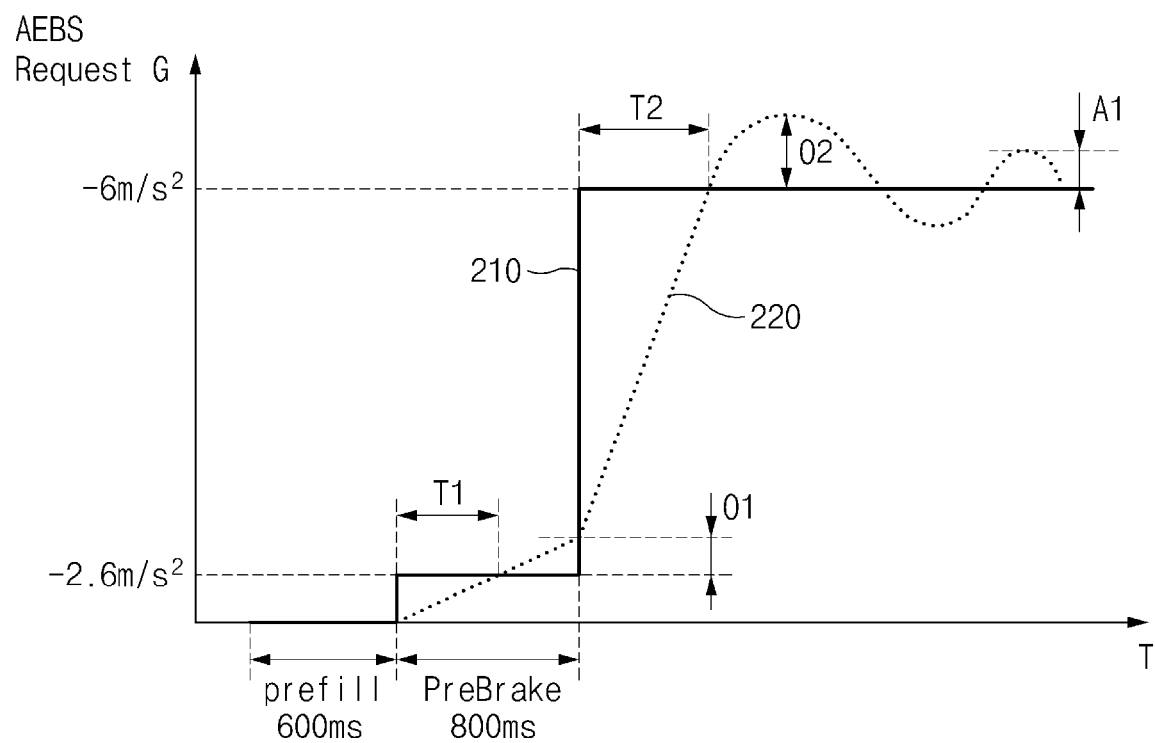
FIG. 2 is an illustrative view illustrating a relationship between a demanded deceleration and an actual deceleration used in an exemplary embodiment of the present disclosure.

Further, a gap may be generated between a deceleration (hereinafter, referred to as a demanded deceleration) demanded by the AEBS and an actual behavior (hereinafter, referral to as an actual deceleration) of the vehicle. Hereinafter, a relationship between the demanded deceleration and the actual deceleration will be described with reference to FIG. 2. In FIG. 2, a vertical axis indicates the demanded deceleration, a horizontal axis indicates a time T, '210' indicates a graph for the demanded deceleration, and '220' indicates a graph for the actual deceleration of the vehicle.

When a primary demanded deceleration is about −2.6 m/s$^2$ as an example, a time T1 is normal when within about 150 ms, but was 430 ms as an experiment result. In other words, an actual deceleration that corresponds to the primary demanded deceleration should be measured within 150 ms, but was measured at 430 ms. Accordingly, the data indicates that insufficient target clamping force was supplied, and thus, the vehicle may not be stopped or decelerated by a desired amount within a desired period of time. This is complemented in the present disclosure.

When a secondary demanded deceleration is about −6 m/s$^2$ as an example, a time T2 is normal when within about 330 ms, but was 470 ms as an experiment result. In other words, an actual deceleration that corresponds to the secondary demanded deceleration should be measured within 330 ms, but was measured at 470 ms. Accordingly, the data indicates that insufficient target clamping force was supplied, and thus, the vehicle may not be decelerated by a desired amount within a desired period of time. This is complemented in the present disclosure.

Furthermore, the information collector 20 of present disclosure may be configured to collect information by inter-operating with the AEBS. Particularly, the information collector 20 may be configured to collect the primary warning signal, the primary demanded deceleration, and the second demanded deceleration generated by the AEBS. The information collector 20 may be configured to collect the information by directly interoperating with the AEBS or collect the information via a vehicle network. The vehicle network may include a controller area network (CAN), a local interconnection network (LIN), a FlexRay, a media oriented system transport (MOST), and the like. The controller 30 may then be configured to perform a general control to operate the respective components described above.

Particularly, the controller 30 may be configured to perform a preparation process to execute rapid braking when the primary warning signal is collected by the information collector 20. In other words, the controller 30 may be configured to operate the EPB 10 to allow the brake shoe to approach the contact point of the brake drum when the primary warning signal is collected. Particularly, the brake shoe may further move by about 10% due to inertia even though a current is blocked due to characteristics of the brake operating motor, Therefore, the controller 30 may be configured to operate the EPB 10 in consideration of this and the brake shoe may approach the brake drum as closely as possible without generating substantial target clamping force.

In addition, the controller 30 may be configured to operate the EPB 10 to perform braking until a primary actual deceleration that corresponds to the primary demanded deceleration is measured, when the primary demanded deceleration is collected by the information collector 20. The primary actual deceleration may be set to about 90% of the primary demanded deceleration to offset an exceeding deceleration (e.g., an exceeding actual deceleration) generated by inertia of a main brake. Particularly, the exceeding deceleration corresponds to '01' in FIG. 2. Accordingly, a section T1 of FIG. 2 may be reduced to 150 ms or less.

Further, the controller 30 may be configured to operate the EPB 10 to perform braking until a secondary actual deceleration that corresponds to the second demanded deceleration is measured, when the secondary demanded deceleration is collected by the information collector 20. The secondary actual deceleration may be set to about 90% of the secondary demanded deceleration to prevent a phenomenon in which a wheel is instantaneously locked by the exceeding deceleration (e.g., the exceeding actual deceleration) generated by the inertia of the main brake. Particularly, the exceeding deceleration corresponds to '02' in FIG. 2. Accordingly, a section T2 of FIG. 2 may be reduced to 330 ms or less.

The controller 30 may additionally be configured to operate the EPB 10 to perform a slow ramp up (SRU) function when the secondary actual deceleration is converged within a threshold range (±A1) in relation to the second demanded deceleration. For example, when the secondary demanded deceleration is about −6 m/s², the secondary actual deceleration, which is a reference for stopping the braking, may be set to about −5.4 m/s², and when the threshold range is about ±0.12 m/s² in relation to −6 m/s², the controller 30 may be configured to operate the EPB 10 to perform the SRU function when the secondary actual deceleration is between about −6.12 m/s² and −5.88 m/s².

In particular, the SRU, which is a function of the EPB 10 increasing target clamping force, increases the target clamping force to prevent collision when a risk of the collision is maintained due to an overload of a commercial vehicle or a limitation of the main brake. In addition, the SRU increases additional target clamping force at a gentle gradient (e.g., a subtle gradient), thereby making it possible to minimize braking impact of the driver. However, when a vehicle dynamic control (VDC) (not illustrated) mounted within the vehicle requests stop of the SRU function to perform a direct control, the VDC has a priority, and the EPB 10 may be configured to terminate the SRU function. In particular, even though the SRU function is stopped, the target clamping force of the EPB 10 may be maintained as a value at the moment at which the SRU function is stopped.

Further, the display 40 may be configured to display general information regarding an operation of the EPB 10. Although an example in which the information collector 20 and the controller 30 are implemented as separate components has been described in an exemplary embodiment of the present disclosure, a controller (not illustrated) of the EPB 10 may be implemented to perform both of a function of the information collector 20 and a function of the controller 30.

Figure 3:
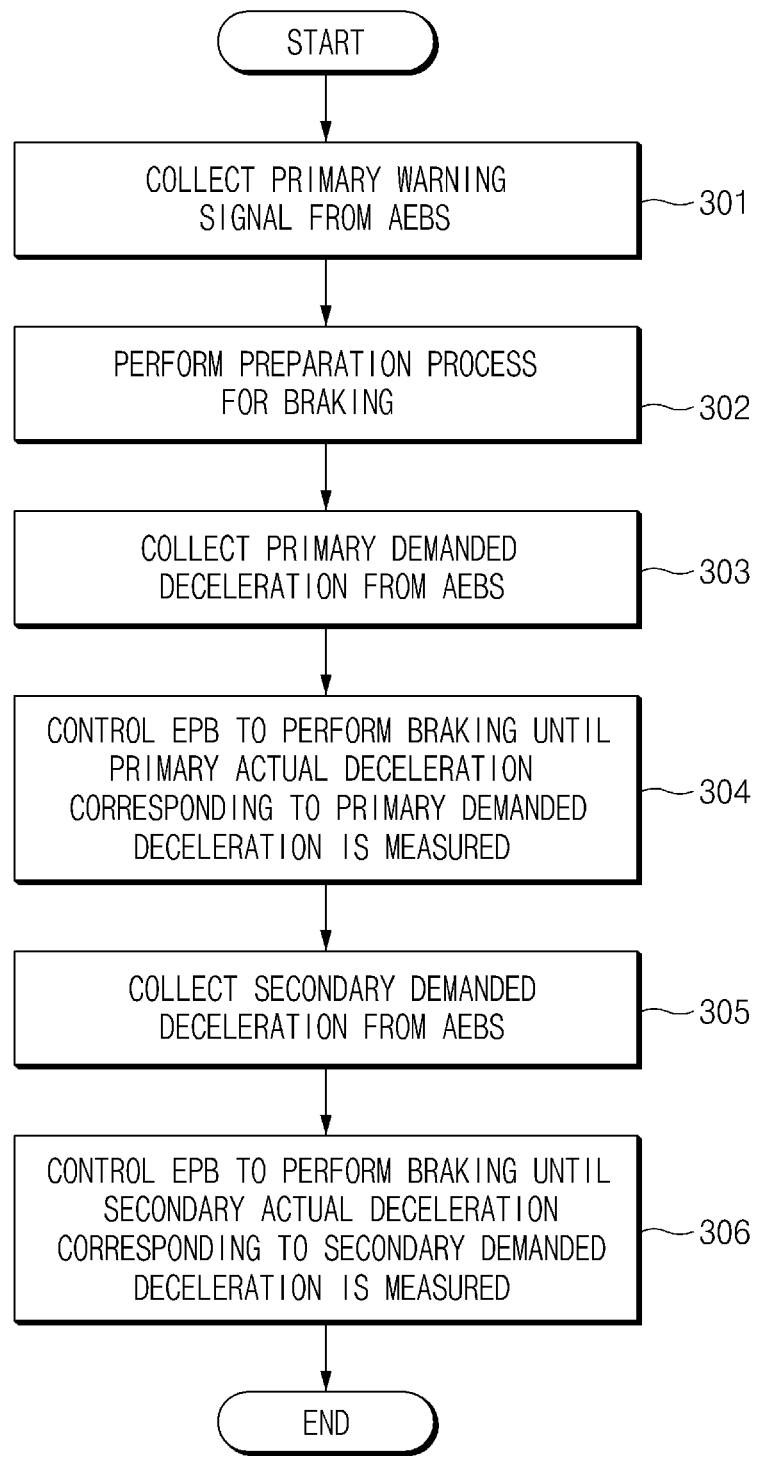
FIG. 3 is a flow chart illustrating a method of controlling an electronic parking brake according to an exemplary embodiment of the present disclosure.

FIG. 3 is a flow chart illustrating a method of controlling an electronic parking brake according to an exemplary embodiment of the present disclosure. First, the information collector 20 may be configured to collect the primary warning signal from the AEBS (301). Then, the controller 30 may be configured to perform a preparation process for braking (302). The preparation process indicates a process of allowing the brake shoe of the EPB 10 to approach to the contact point of the brake drum. The information collector 20 may then be configured to collect the primary demanded deceleration from the AEBS (303).

Further, the controller 30 may be configured to operate the EPB 10 to perform the braking until the primary actual deceleration that corresponds to the primary demanded deceleration is measured (304). The information collector 20 may be configured to collect the secondary demanded deceleration from the AEBS (305). The secondary demanded deceleration may be a maximum demanded deceleration. Then, the controller 30 may be configured to operate the EPB 10 to perform the braking or decelerating until the secondary actual deceleration that corresponds to the secondary demanded deceleration is measured (306). Further, the controller 30 may also be configured to operate the EPB 10 to perform the SRU function when the secondary actual deceleration is converged within a threshold range in relation to the second demanded deceleration. In particular, when a stop request is received from the VDC, the controller 30 may be configured to operate the EPB 10 to stop the SRU function.

Meanwhile, the method of controlling an electronic parking brake according to an exemplary embodiment of the present disclosure as described above may be created by a computer program. In addition, codes and code segments configuring the computer program may be easily inferred by a computer programmer skilled in the related art. Further, the created computer program is stored in a computer-readable recording medium (information storing medium) and is read and executed by a computer to implement the method of controlling an electronic parking brake according to an exemplary embodiment of the present disclosure. Further, the computer-readable recording medium includes all types of recording media that are readable by the computer.

As described above, according to the exemplary embodiment of the present disclosure, the additional target clamping force may be generated through interoperation with the AEBS to improve performance of the AEBS, thereby making it possible to prevent the collision with the preceding vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus of controlling an electronic parking brake, comprising:
an electric parking brake (EPB) configured to generate target clamping force;
an information collector configured to collect a primary warning signal and a primary demanded deceleration by interoperating with an advanced emergency brake system (AEBS); and
a controller configured to operate the EPB to perform a preparation process for braking when the primary warning signal is collected and perform braking until a primary actual deceleration that corresponds to the primary demanded deceleration is measured when the primary demanded deceleration is collected,
wherein the controller is configured to operate the EPB to assist target clamping force of the AEBS.

2. The apparatus of controlling an electronic parking brake according to claim 1, wherein the EPB includes a brake shoe, a brake drum, and a brake operating motor.

3. The apparatus of controlling an electronic parking brake according to claim 2, wherein the controller is configured to operate the EPB to allow the brake shoe to approach a contact point of the brake drum, as the preparation process.

4. The apparatus of controlling an electronic parking brake according to claim 3, wherein the controller is configured to operate the EPB based on the brake shoe moving further due to inertia when a current is blocked due to characteristics of the brake operating motor.

5. The apparatus of controlling an electronic parking brake according to claim 1, wherein the primary actual deceleration is the primary demanded deceleration or less.

6. The apparatus of controlling an electronic parking brake according to claim 5, wherein the primary actual deceleration is about 90% of the primary demanded deceleration.

7. The apparatus of controlling an electronic parking brake according to claim 1, wherein the controller is configured to operate the EPB to perform braking until a secondary actual deceleration that corresponds to a secondary demanded deceleration is measured when the secondary demanded deceleration is collected.

8. The apparatus of controlling an electronic parking brake according to claim 7, wherein the secondary actual deceleration is the secondary demanded deceleration or less.

9. The apparatus of controlling an electronic parking brake according to claim 8, wherein the secondary actual deceleration is about 90% of the secondary demanded deceleration.

10. The apparatus of controlling an electronic parking brake according to claim 7, wherein the controller is configured to operate the EPB to perform a slow ramp up (SRU) function when the secondary actual deceleration is converged within a threshold range in relation to the secondary demanded deceleration.

11. The apparatus of controlling an electronic parking brake according to claim 10, wherein the controller is configured to operate the EPB to stop the SRU function based on a request from a vehicle dynamic control (VDC).

12. A method of controlling an electronic parking brake, comprising:
collecting, by an information collector, a primary warning signal from an advanced emergency brake system (AEBS);
performing, by a controller, a preparation process for braking;
collecting, by the information collector, a primary demanded deceleration from the AEBS; and
operating, by the controller, an electric parking brake (EPB) to perform braking until a primary actual deceleration that corresponds to the primary demanded deceleration is measured,
wherein the controller is configured to operate the EPB to assist target clamping force of the AEBS.

13. The method of controlling an electronic parking brake according to claim 12, wherein the primary actual deceleration is the primary demanded deceleration or less.

14. The method of controlling an electronic parking brake according to claim 12, further comprising:
collecting, by the information collector, a secondary demanded deceleration from the AEBS; and
operating, by the controller, the EPB to perform braking until a secondary actual deceleration that corresponds to the secondary demanded deceleration is measured.

15. The method of controlling an electronic parking brake according to claim 14, wherein the secondary actual deceleration is the secondary demanded deceleration or less.

16. The method of controlling an electronic parking brake according to claim 12, wherein the EPB includes a brake shoe, a brake drum, and a brake operating motor.

17. The method of controlling an electronic parking brake according to claim 16, wherein the controller is configured to operate the EPB to allow the brake shoe to approach a contact point of the brake drum, as the preparation process.

18. The method of controlling an electronic parking brake according to claim 17, wherein the controller is configured to operate the EPB based on the brake shoe moving further due to inertia when a current is blocked due to characteristics of the brake operating motor.

19. The method of controlling an electronic parking brake according to claim 14, further comprising:
operating, by the controller, the EPB to perform a SRU function when the secondary actual deceleration is converged within a threshold range in relation to the secondary demanded deceleration.

20. The method of controlling an electronic parking brake according to claim 19, wherein the controller is configured to operate the EPB to stop the SRU function based on a request from a vehicle dynamic control (VDC).

* * * * *